J. A. MURPHEY.
AUTOMOBILE LOCK.
APPLICATION FILED JULY 15, 1919.
1,367,200.
Patented Feb. 1, 1921.
3 SHEETS—SHEET 1.
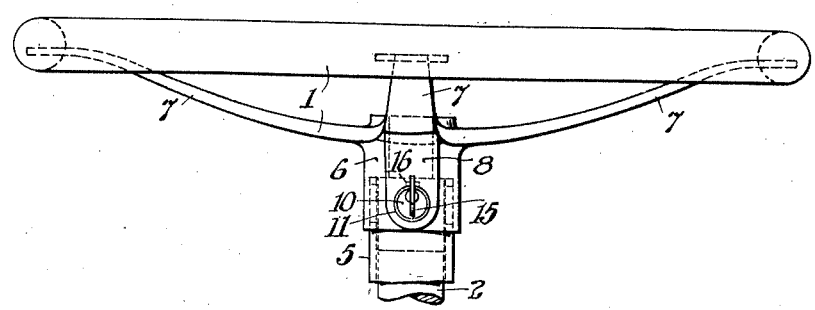
FIG. I.
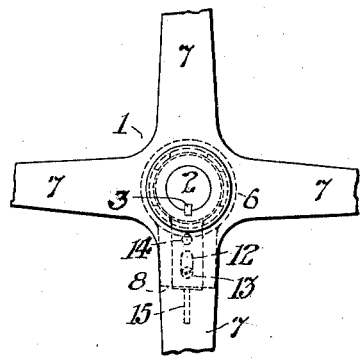
FIG. II.
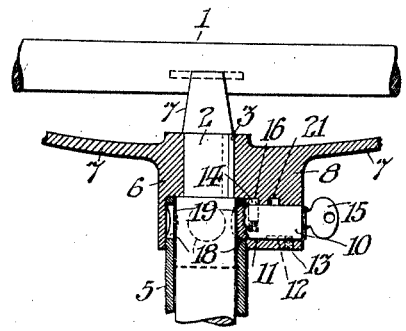
FIG. III.
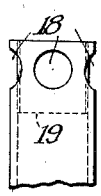
FIG. IV.
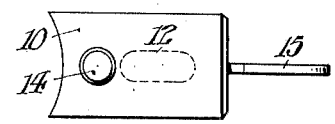
FIG. V.
INVENTOR.

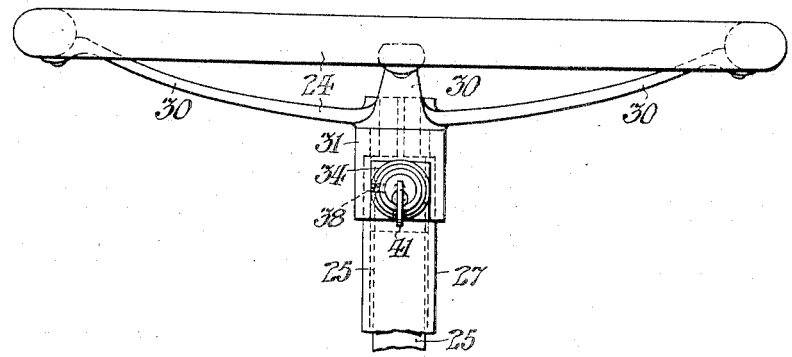
FIG VI.
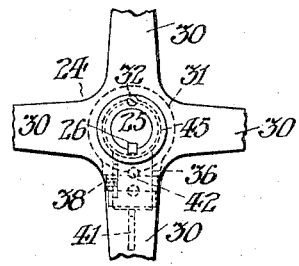
FIG VII.
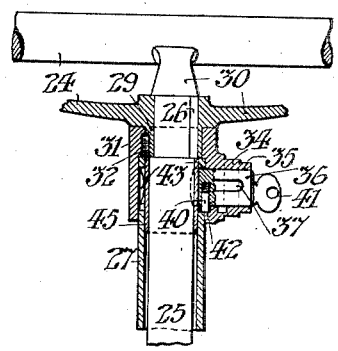
FIG VIII.
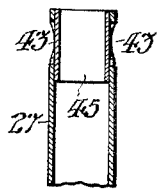
FIG IX.
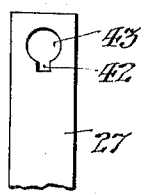
FIG X.
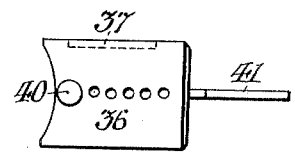
FIG XI.

J. A. MURPHEY.
AUTOMOBILE LOCK.
APPLICATION FILED JULY 15, 1919.
1,367,200.
Patented Feb. 1, 1921.
3 SHEETS—SHEET 3.
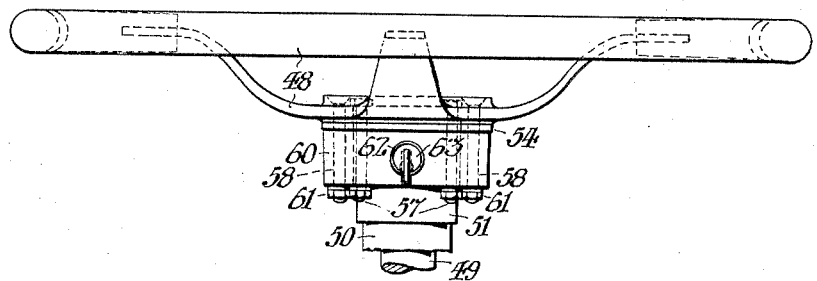
FIG. XII.
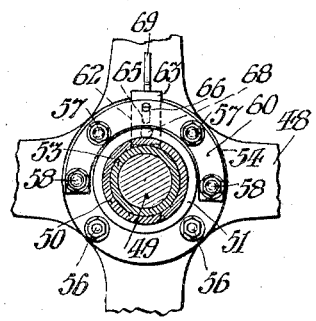
FIG. XIII.
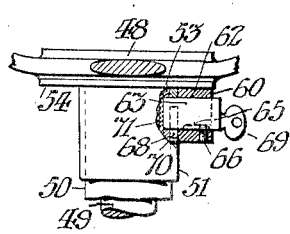
FIG. XIV.
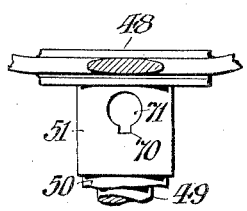
FIG. XV.
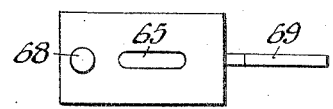
FIG. XVI.
INVENTOR.

UNITED STATES PATENT OFFICE.

JAMES A. MURPHEY, OF PHILADELPHIA, PENNSYLVANIA.

AUTOMOBILE-LOCK.

1,367,200.   Specification of Letters Patent.   Patented Feb. 1, 1921.

Application filed July 15, 1919. Serial No. 310,947.

*To all whom it may concern:*

Be it known that I, JAMES A. MURPHEY, a citizen of the United States, residing at Germantown, Philadelphia, in the State of Pennsylvania, have invented a certain new and useful Improvement in Automobile-Locks, whereof the following is a specification, reference being had to the accompanying drawings.

My invention relates to locking means for detachably rigidly connecting the steering shaft of a self-propelled vehicle with the bearing tube inclosing said shaft so as to prevent the vehicle from being steered when locked; and preferably so constructed and arranged that the front wheels of such a vehicle may be turned at right angles to their normal position against a curb or similar obstruction before thus locking it, to prevent the vehicle from being towed.

As hereinafter described; my invention includes a lock, preferably of a "pin" key type, which may be permanently retained in connection with the vehicle but alternately in two positions, in both of which it is locked, but in only one of which it locks the vehicle.

Although my present invention is of the general class claimed in my Letters Patent of the United States No. 1,156,615 dated October 12, 1915; it embodies improvements as to the specific construction and arrangement of the elements thereof whereby the cost of manufacture is reduced to the minimum, and the lock rendered applicable to the respectively different forms of automobile steering wheels and appurtenances of the present standardized forms.

My invention includes the various novel features of construction and arrangement hereinafter more definitely specified.

In the drawings; Figure I is a fragmentary elevation showing the steering wheel of an automobile, the steering shaft which is rigidly connected with said wheel, both of which are normally free to rotate; the bearing tube through which said shaft extends into operative relation with the front wheels of the vehicle, and which is stationary in the vehicle body, and a convenient embodiment of my invention adapted to prevent any rotary movement of said wheel, by locking it in connection with said bearing tube. This form provides a specially constructed steering wheel of general application to standard automobiles.

Fig. II is a fragmentary plan view of the structure shown in Fig. I.

Fig. III is a fragmentary vertical sectional view of said structure shown in Figs. I and II.

Fig. IV is a fragmentary elevation of the upper end of said stationary bearing tube.

Fig. V is a full-sized plan view of the detachable lock and its key indicated in Figs. I, II and III, and which is normally carried in the hub of the steering wheel shown in said figures.

Fig. VI is a fragmentary elevation, similar to Fig. I, but showing a modified form of my invention wherein the lock itself, instead of being carried in the hub of the steering wheel, is carried in an auxiliary sleeve which is detachably connected with said hub by means rendered inaccessible within said sleeve when the device is locked. This form provides locking means applicable to steering wheels which are furnished with ordinary automobiles.

Fig. VII is a fragmentary plan view of the structure shown in Fig. VI.

Fig. VIII is a fragmentary vertical sectional view of said structure shown in Figs. VI and VII.

Fig. IX is a detached sectional view of the stationary bearing tube corresponding with Fig. VIII.

Fig. X is an elevation of said bearing tube shown in Figs. VIII and IX.

Fig. XI is a full-sized inverted plan view of the lock and its key indicated in Figs. VI, VII and VIII.

Fig. XII is a fragmentary elevation of a steering wheel and its appurtenances of the type employed in the "Packard" car, with a modified form of my invention applied thereto; wherein the locking casing is a sector of an annulus riveted to the hub of said wheel.

Fig. XIII is a fragmentary inverted plan view of the structure shown in Fig. XII; showing said sector.

Fig. XIV is a fragmentary vertical sectional view of said structure shown in Figs. XII and XIII.

Fig. XV is a fragmentary elevation of the wheel hub indicated in Figs. XII, XIII, and XIV.

Fig. XVI is an inverted plan view of the lock and its key indicated in Figs. XII, XIII and XIV.

Referring to the form of my invention shown in Figs. I to V inclusive: the rotary steering wheel 1 of the automobile is normally rigidly connected with the steering shaft 2, by the key 3. Said shaft 2 is journaled in the stationary bearing tube 5 which is rigidly connected with the body of the vehicle.

As indicated in Figs. I, II, and III, the hub 6 of said wheel 1 is cast in unitary relation with its spokes 7 and includes the eccentric extensions 8 which forms a casing for the lock 10 which is mounted to reciprocate in the lock socket 11 in said extension; the extent of its reciprocation being limited by the slot 12 in which the screw 13 extends in rigid relation with said hub 6. Said lock 10 includes the slide bolt 14 which is operable by the key 15 and, when in locked position, engages the recess 16 in the lock casing; in which position said lock 10 extends in one of the four openings 18 in said bearing tube 5 so as to prevent any rotary movement of said steering wheel 1. In order to afford the maximum engagement with said tube 5; the inner end of said lock 10 is cylindrically concave as best shown in Fig. V. Although I prefer to reinforce said tube 5 by a bushing 19, driven therein as indicated in Figs III and IV, and said bushing serves as a stop limiting the inward movement of said lock 10; said bushing may be omitted.

In order to release said steering wheel 1 from its locked stationary position shown in Figs. I to III inclusive: the key 15 may be turned, clockwise, to retract the locking bolt 14 from said recess 16, and said lock 10 be withdrawn to the extent limited by said slot 12 and screw 13, whereupon, said locking bolt 14 registers with the recess 21 and the lock may be secured in that position, in which it is unlocked as far as the steering wheel is concerned, by thrusting said slide bolt 14 outwardly, by reverse turning movement of said key 15.

Said key 15 may be withdrawn from said lock 10 whenever the lock bolt 14 is projected, but cannot be withdrawn from the lock 10 when said bolt 14 is retracted and, consequently, serves as a handle by which said lock 10 may be reciprocated. Of course, when said screw 13 is withdrawn from said slot 12; said lock 10 may be withdrawn from its casing in said hub extension 8. However, in the ordinary use of this form of my invention, said screw 13 remains in the position shown in Fig. III and said lock 10 is continuously carried in the hub 6 of the wheel 1.

Referring to the form of my invention shown in Figs. VI to XI inclusive; the rotary steering wheel 24 of the automobile is normally rigidly connected with the steering shaft 25 by the key 26. Said shaft 25 is journaled in the stationary bearing tube 27 which is rigidly connected with the body of the vehicle.

As indicated in Fig. VIII; the hub 29 of said wheel 24 is cast in unitary relation with its spokes 30, but the hub sleeve 31, which forms the lock casing, is detachably, although rigidly, connected therewith, by the screw 32 which extends partly in said hub and in said sleeve and is normally concealed and rendered inaccessible, by the latter. Said hub 31 includes the eccentric extension 34 having the lock socket 35 in which the lock 36 is mounted to reciprocate; the extent of its reciprocation being limited by the slot 37 in which the screw 38 extends, as indicated in Figs. VI and VII, in rigid relation with said hub sleeve 31 and said wheel 24. Said lock 36 includes the slide bolt 40 which is operable by the key 41 and, when in locked position, engages the recess 42 which extends both in said sleeve 31 and in said bearing tube 27; in which position said lock 36 extends in the opening 43 in said stationary bearing sleeve 27 so as to prevent any rotary movement of said steering wheel 24. In order to afford the maximum engagement with said tube 27; the inner end of said lock 36 is cylindrically concave as best shown in Fig. XI. Although I prefer to reinforce said tube 27 by the bushing 45, driven therein as indicated in Figs. VIII and IX, and said bushing serves as a stop limiting the inward movement of said lock 36; said bushing may be omitted.

In order to release said steering wheel 24 from its locked stationary position shown in Figs. VI to VIII inclusive; said key 41 may be turned, clock-wise, to retract said locking bolt 40 from said recess 42, and said lock 36 be withdrawn to the extent limited by said slot 37 and screw 38.

Said key 41 may be withdrawn from said lock 36 whenever the lock bolt 40 is projected, but serves as a handle by which said lock may be reciprocated when in unlocked condition. Of course, when said screw 38 is withdrawn from said recess 37; said lock 36 may be withdrawn from its casing in said hub sleeve 31.

Referring to the form of my invention shown in Figs. XII to XVI inclusive, which, as above noted, is of the type employed in the "Packard" car; the rotary steering wheel 48 of the automobile is normally rigidly connected with the steering shaft 49 and said shaft is journaled in the stationary bearing tube 50 which is rigidly connected with the body of the vehicle, and has the external reinforcing sleeve 51 rigidly connected therewith at its upper end. The steering wheel hub 53, which fits within said bearing tube 50 as shown in Fig. XIII, is detachably connected with said wheel 48; said hub having the annular flange 54 connected with said wheel 48 by the six bolts 56, 57 and 58.

Ordinarily, said wheel 48 and hub 53 are connected by but four bolts, each like the two bolts 56, only extending through the wheel 48 and the hub flange 54. However, I provide the lock casing 60, which is a sector of a cylindrical tube, as best shown in Fig. XIII, and secure the same by two special bolts 57 extending therethrough in lieu of two of the ordinary, shorter, bolts furnished with the "Packard" wheel, and also add two bolts 58, for which extra holes are drilled through said wheel 48 and flange 54, when my lock accessory is applied thereto.

In order to prevent felonious removal of said lock casing 60 from said wheel 48, I find it convenient to rivet the lower ends of said bolts 58 in their nuts 61, so that it is necessary to file off, or otherwise remove, the riveted portions thereof, in order to remove said lock casing from said wheel.

Said lock casing 60 has the cylindrical tubular lock socket 62 in which the lock 63 is mounted to reciprocate; the extent of its reciprocation being limited by the slot 65 in which the screw 66 extends, as indicated in Figs. XIII and XIV, in rigid relation with said lock casing 60 and said wheel 48. Said lock 63 includes the slide bolt 68 which is operable by the key 69 and, when in locked position, engages the recess 70 which extends in said sleeve 51; in which position said lock 63 extends in the opening 71 in said stationary bearing tube 50 so as to prevent any rotary movement of said steering wheel 48.

In order to release said steering wheel 48 from its locked stationary position shown in Figs. XII to XIV inclusive; said key 69 may be turned, clock-wise, to retract said locking bolt from said recess 70 and said lock be withdrawn to the extent limited by said slot 65 and screw 66; said key 69 serving as a handle by which said lock may be reciprocated when in unlocked position. However, said key 69 may be withdrawn from said lock 63, whenever the lock bolt 68 is projected to the position shown in Fig. XIV and, when said screw 66 is withdrawn from said slot 65; said lock 63 may be withdrawn from its casing 60.

It may be observed that the employment of a lock of cylindrical form, as distinguished from the unsymmetrical form employed in the structures shown in said Letters Patent 1,156,615 not only lessens the cost of the lock itself, but permits the employment of ordinary rotary boring tools to form the lock socket in the wheel structure, and thus materially lessens the cost of manufacture. Moreover, the provision of the lock casing in a single wheel spider frame casting having the wheel spoke and hub members in unitary relation with said casing, materially reduces the cost of manufacture of my invention as compared with the structures shown in said Letters Patent; and such costs are further reduced by forming the lock engaging openings directly in the stationary bearing tube of the rotary steering shaft, instead of in an auxiliary member attached to such a tube, as shown in said Letters Patent.

Therefore, I do not desire to limit myself to the precise details of construction and arrangement herein set forth, as it is obvious that various modifications may be made therein without departing from the essential features of my invention, as defined in the appended claims.

I claim:

1. The combination with a rotary steering wheel of an automobile, having a spider frame formed of a single casting including a spoke member and an axial tubular hub member; said hub member having an axial bore for a steering shaft and a counterbore in concentric relation therewith adapted to receive the upper end of a stationary bearing tube; and said casting including a lock casing, in unitary relation therewith, with a cylindrical tubular lock socket at right angles to the axis of said wheel, and two radially extending locking bolt recesses in said socket, at different radial distances from the axis of said wheel; and a set screw in said casing, extending into said socket; of a rotary steering shaft, axially rigidly connected with said wheel; a stationary bearing tube in which said shaft is journaled, having a circumferential series of lock openings, at its upper end, within said hub counterbore; a tubular bushing fixed in the upper end of said bearing tube, serving as a stop at the inner ends of said lock openings; and a key lock, separable from said wheel, having a cylindrical body fitted to reciprocate in said lock socket and to be selectively thrust into said lock openings in said bearing tube, having a radially movable locking bolt, arranged to be projected and withdrawn by a key, to alternately extend in said locking bolt recesses; whereby, said lock may be alternately held in locked and unlocked position; said lock body having a slot in its circumference, extending parallel with its axis, engaging said screw, whereby said lock is maintained in such rotary position that said locking bolt may register with said recesses, the extent of reciprocation of said lock body is limited, and accidental loss of said lock prevented.

2. The combination with a rotary steering wheel of an automobile, having a spider frame including a spoke member and an axial tubular hub member; said hub member having an axial bore adapted to receive the upper end of a stationary bearing tube; a lock casing, in unitary relation with said hub member, having a cylindrical tubular lock socket at right angles to the axis of said wheel, and two radially extending locking bolt recesses in said socket, at different radial distances from the axis of said wheel; and a set screw in said casing, extending into said socket; of a rotary steering shaft, axially rigidly connected with said wheel; a stationary bearing tube in which said shaft is journaled, having a lock opening, at its upper end, within said hub bore; a tubular bushing fixed in the upper end of said bearing tube, serving as a stop at the inner end of said lock opening; and a key lock, separable from said wheel, having a cylindrical body fitted to reciprocate in said lock socket and to be thrust into said lock opening in said bearing tube, having a locking bolt, arranged to be projected and withdrawn by a key, to alternately extend in said locking bolt recesses; whereby, said lock may be alternately held in locked and unlocked position; said lock body having a slot in its circumference, extending parallel with its axis, engaging said set screw, whereby said lock is maintained in such rotary position that said locking bolt may register with said recesses, the extent of reciprocation of said lock body is limited, and accidental loss of said lock prevented.

3. The combination with a rotary steering wheel of an automobile, having a spider frame including a spoke member and an axial tubular hub member; said hub member having an axial bore adapted to receive the upper end of a stationary bearing tube; a lock casing, in unitary relation with said hub member, having a cylindrical tubular lock socket at right angles to the axis of said wheel, and two radially extending locking bolt recesses in said socket, at different radial distances from the axis of said wheel; and a set screw in said casing, extending into said socket; of a rotary steering shaft, axially rigidly connected with said wheel; a stationary bearing tube in which said shaft is journaled, having a lock opening, at its upper end, within said hub bore; and a key lock, separable from said wheel, having a cylindrical body fitted to reciprocate in said lock socket and to be thrust into said lock opening in said bearing tube, having a locking bolt, arranged to be projected and withdrawn by a key, to alternately extend in said locking bolt recesses; whereby, said lock may be alternately held in locked and unlocked position; said lock body having a slot in its circumference, extending parallel with its axis, engaging said set screw, whereby said lock is maintained in such rotary position that said locking bolt may register with said recesses, the extent of reciprocation of said lock body is limited, and accidental loss of said lock prevented.

4. The combination with a rotary steering wheel of an automobile, having a spider frame including a spoke member and an axial tubular hub member; said hub member having an axial bore adapted to receive the upper end of a stationary bearing tube; a lock casing, in unitary relation with said hub member, having a cylindrical tubular lock socket at right angles to the axis of said wheel, and two radially extending locking bolt recesses in said socket, at different radial distances from the axis of said wheel; of a rotary steering shaft, axially rigidly connected with said wheel; a stationary bearing tube in which said shaft is journaled, having a lock opening, at its upper end, within said hub bore; and a key lock, separable from said wheel, having a cylindrical body fitted to reciprocate in said lock socket and to be thrust into said lock opening in said bearing tube, having a locking bolt, arranged to be projected and withdrawn by a key, to alternately extend in said locking bolt recesses; whereby, said lock may be alternately held in locked and unlocked position.

5. The combination with a rotary steering wheel of an automobile, having a spider frame including a spoke member and an axial tubular hub member; said hub member having an axial bore adapted to receive the upper end of a stationary bearing tube; a lock casing, in rigid relation with said hub member having a lock socket and a locking bolt recess in said socket; of a rotary steering shaft axially rigidly connected with said wheel; a stationary bearing tube in which said shaft is journaled, having a lock opening, at its upper end, within said hub bore; and a key lock, separable from said wheel, having a body fitted to reciprocate in said lock socket and to be thrust into said lock opening in said bearing tube, having a locking bolt, arranged to be projected and withdrawn by a key to engage and disengage said locking bolt recess.

6. The combination with a rotary steering wheel having an axial tubular hub member, with an axial bore adapted to receive the upper end of a stationary bearing tube; and a lock casing, in rigid relation with said hub member having a lock socket; of a rotary steering shaft, axially rigidly connected with said wheel; a stationary bearing tube in which said shaft is journaled, having a lock opening, at its upper end, within said hub bore; and a key lock, having a body fitted to reciprocate in said lock socket and to be thrust into said lock opening in said bearing tube, and having a projecting locking bolt, arranged to be withdrawn by a key; whereby, said lock may be held in locked position, and be withdrawn.

7. The combination with a rotary steering wheel of an automobile, having a spider frame formed of a single casting including a spoke member and a hub member; including a lock socket; of a lock directly mounted in said hub member, to reciprocate in said socket; a steering shaft in axial connection with said wheel; a stationary bearing tube, in which said shaft is journaled, having a lock opening formed directly in it; arranged to directly receive said lock in said bearing tube; and means carried by said lock, controlled by a key, arranged to detachably secure said lock in said hub casing in directly locked engagement with said bearing tube and preventing steering movement of said wheel and shaft.

8. The combination with a rotary steering wheel of an automobile, having a spider frame formed of a single casting including a spoke member and a hub member, including a lock socket; of a lock directly mounted in said hub member, to reciprocate in said socket; a steering shaft in axial connection with said wheel; a stationary bearing tube, in which said shaft is journaled, having a lock opening formed directly in it; arranged to directly receive said lock in said bearing tube; and means carried by said lock, arranged to detachably secure said lock in said hub casing in directly locked engagement with said bearing tube and preventing steering movement of said wheel and shaft.

In testimony whereof I have hereunto signed my name at Philadelphia, Pennsylvania, this twelfth day of July, 1919.

JAMES A. MURPHEY.

Witnesses:
ARTHUR E. PAIGE,
FRANK E. PAIGE.